(12) United States Patent
Maruyama et al.

(10) Patent No.: US 7,302,731 B2
(45) Date of Patent: Dec. 4, 2007

(54) WASHER EQUIPMENT

(75) Inventors: Akira Maruyama, Toyohashi (JP); Shuuichirou Itou, Toyohashi (JP); Akihisa Motono, Kosai (JP); Tetsuya Nakatsukasa, Okazaki (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 725 days.

(21) Appl. No.: 10/670,512

(22) Filed: Sep. 26, 2003

(65) Prior Publication Data

US 2004/0117937 A1 Jun. 24, 2004

(30) Foreign Application Priority Data

Dec. 11, 2002 (JP) ............................. 2002-359180
May 30, 2003 (JP) ............................. 2003-154935

(51) Int. Cl.
*B60S 1/46* (2006.01)
*B60S 1/52* (2006.01)

(52) U.S. Cl. .................. 15/250.02; 15/250.01; 239/284.1

(58) Field of Classification Search .......... 15/250.01, 15/250.04; 239/284.1, 284.2
See application file for complete search history.

(56) References Cited

U.S. PATENT DOCUMENTS

| | | | |
|---|---|---|---|
| 3,199,787 A | 8/1965 | Oishei et al. | |
| 3,574,337 A | 4/1971 | Edwards et al. | |
| 3,791,584 A | 2/1974 | Drew et al. | |
| 4,052,002 A | 10/1977 | Stouffer et al. | |
| 4,151,955 A | 5/1979 | Stouffer | |
| 4,157,161 A | 6/1979 | Bauer | |
| 4,185,777 A | 1/1980 | Bauer | |
| 4,210,283 A | 7/1980 | Stouffer et al. | |
| 4,390,128 A | 6/1983 | Fujikawa et al. | |
| 4,508,267 A | 4/1985 | Stouffer | |
| 4,520,961 A | 6/1985 | Hueber | |

(Continued)

FOREIGN PATENT DOCUMENTS

DE  198 54 127  5/2000

(Continued)

OTHER PUBLICATIONS

First Office Action from Chinese Patent Office issued on Jan. 12, 2007 for the corresponding Chinese patent application No. 200310101409.4 (a copy and English translation thereof).

(Continued)

*Primary Examiner*—Gary K. Graham
(74) *Attorney, Agent, or Firm*—Posz Law Group, PLC

(57) ABSTRACT

Washer equipment jets washings to each sweeping area of driver's side and passenger's side windshield of a vehicle, which are swept by driver's side and passenger's side wiper blades, respectively, in such a manner that they synchronize together and move to a same direction. The washer equipment includes a primary jet part and a secondary jet part. The primary jet part splashes the washings down to a first splashdown disposed in each sweeping area of the driver's side and passenger's side wiper blades. The secondary jet part splashes the washings down to a second splashdown disposed upper side of the sweeping area of the driver's side wiper blade and disposed outside an upper reverse position of the passenger's side wiper blade.

24 Claims, 8 Drawing Sheets

U.S. PATENT DOCUMENTS

| | | | |
|---|---|---|---|
| 4,721,251 A * | 1/1988 | Kondo et al. | 239/412 |
| 5,749,525 A | 5/1998 | Stouffer | |
| 5,820,034 A | 10/1998 | Hess | |
| 5,860,603 A | 1/1999 | Raghu et al. | |
| 5,975,431 A | 11/1999 | Harita et al. | |
| 6,062,491 A | 5/2000 | Hahn et al. | |
| 6,186,409 B1 | 2/2001 | Srinath et al. | |
| 6,240,945 B1 | 6/2001 | Srinath et al. | |
| 6,253,782 B1 | 7/2001 | Raghu | |
| 6,354,515 B1 | 3/2002 | Matsumoto et al. | |
| 7,014,131 B2 * | 3/2006 | Berning et al. | 239/589.1 |
| 2003/0234303 A1 | 12/2003 | Berning et al. | |

FOREIGN PATENT DOCUMENTS

| EP | 1 082 999 | 3/2001 |
|---|---|---|
| FR | 2 548 606 | 1/1985 |
| JP | A-S53-02828 | 1/1978 |
| JP | A-S61-57452 | 3/1986 |
| JP | U-H01-172951 | 12/1989 |
| JP | A-H05-301564 | 11/1993 |
| JP | A-10-194091 | 7/1998 |
| JP | A-2002-67887 | 3/2002 |
| JP | A-2002-79918 | 3/2002 |

OTHER PUBLICATIONS

Notice of Reason for Refusal from Japanese Patent Office issued on Oct. 3, 2006 for the corresponding Japanese patent application No. 2002-359180 (a copy and English translation thereof).

European Search Report dated Mar. 4, 2004.

* cited by examiner

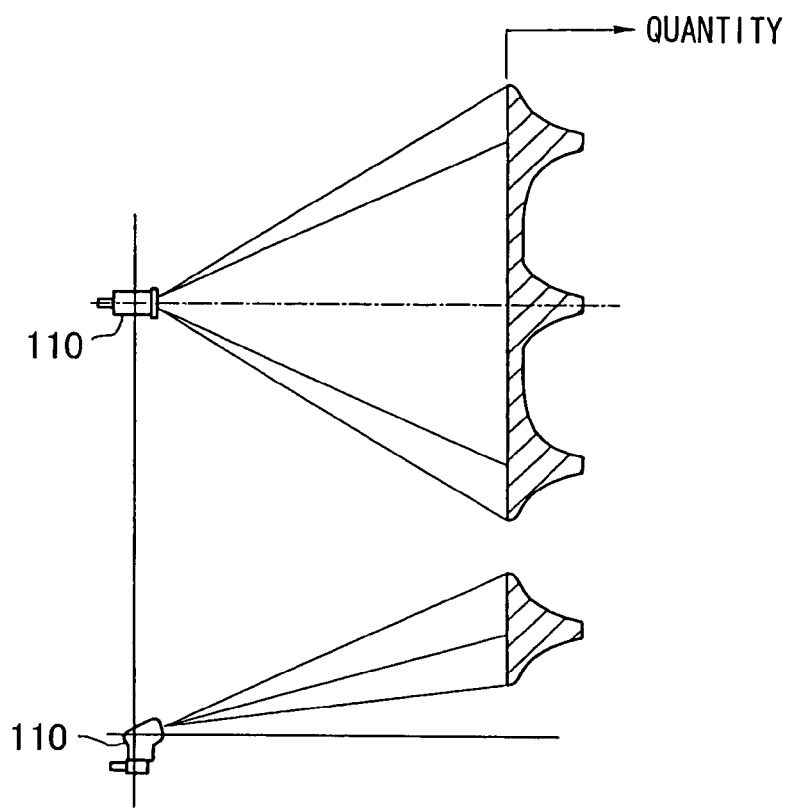
FIG. 7A
FIG. 7B
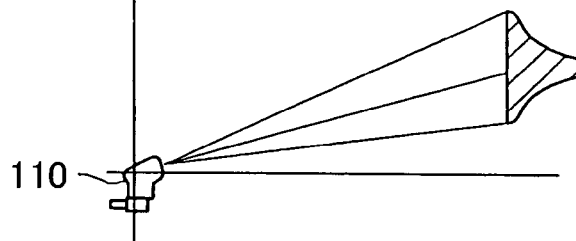
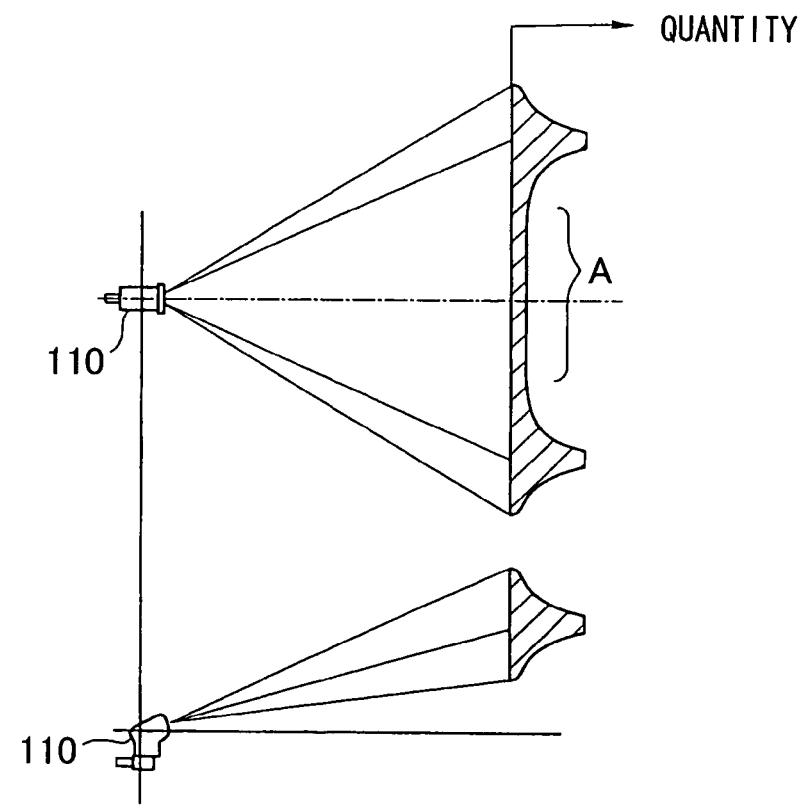
FIG. 8A
FIG. 8B

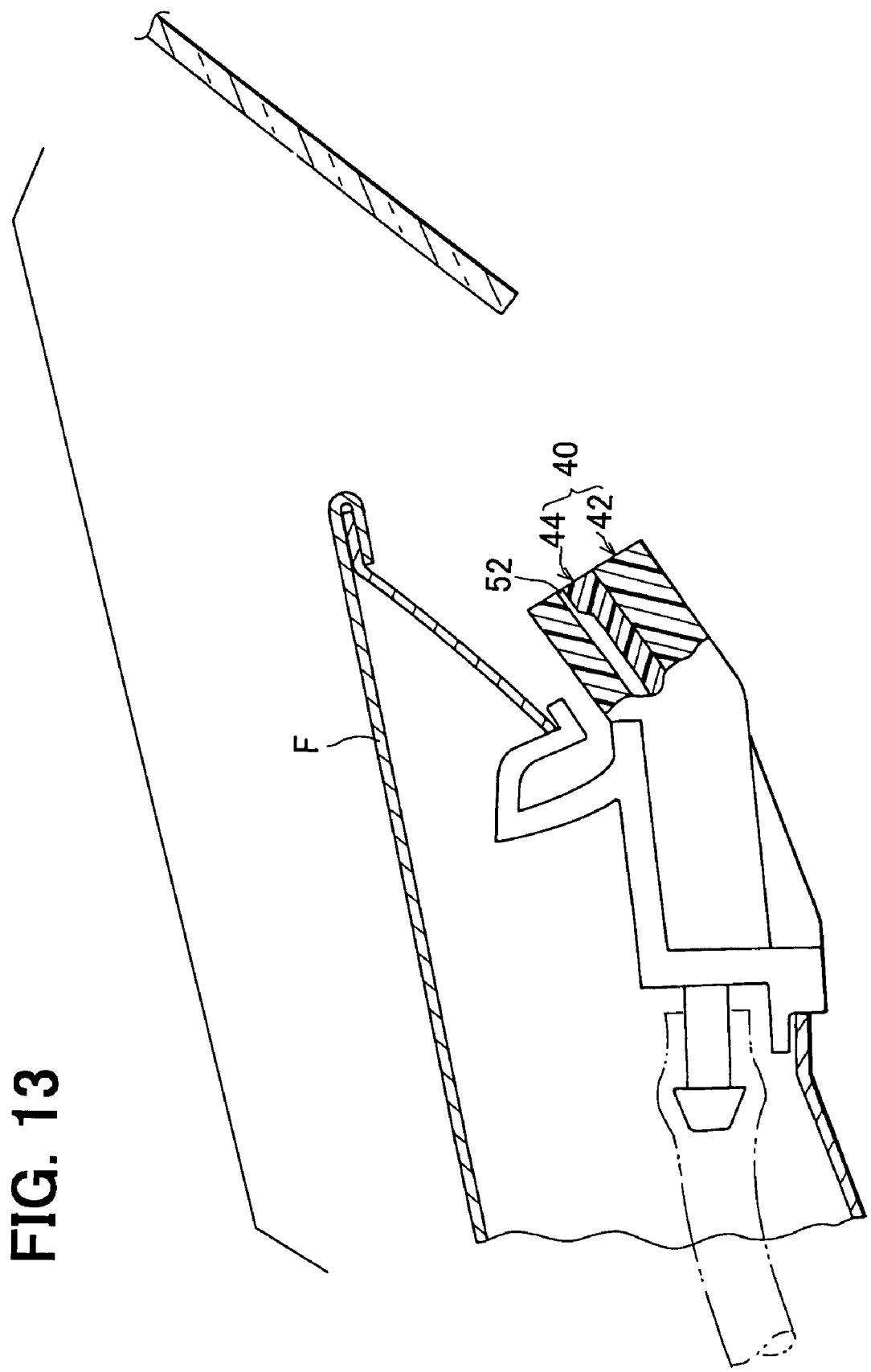

WASHER EQUIPMENT

CROSS REFERENCE TO RELATED APPLICATION

This application is based on Japanese Patent Applications No. 2002-359180 filed on Dec. 11, 2002, and No. 2003-154935 filed on May 30, 2003, the disclosures of which are incorporated herein by reference.

FIELD OF THE INVENTION

The present invention relates to washer equipment for jetting washings so as to wash a windshield of a vehicle and the like.

BACKGROUND OF THE INVENTION

Washer equipment for jetting washings so as to wash a windshield of a vehicle and the like includes a washer nozzle. The washer nozzle connects to a tank with a hose. The tank stores washings, and the washings are compressed and delivered by an electric pump mounted in the tank, so that the washings are jetted from the washer nozzle.

The washer equipment is required to sweep and wash a wide area in short time by using a small amount of the washings. According to this requirement, washer equipment with a washing supplier is disclosed in Japanese Unexamined Patent Application Publication No. 2002-79918. This washer equipment jets the washings by a well-known directional jet flow type washer nozzle (i.e., a single jet type washer nozzle) and by a diffusion jet type washer nozzle (i.e., a spray jet type washer nozzle) that can jet the washings with a diffusion jet flow having a fan shape in a wide area.

The washer equipment according to the prior art includes the directional jet flow type washer nozzle and the diffusion jet type washer nozzle. The directional jet flow type washer nozzle jets the washings toward a sweep area of a driver's side wiper blade. The diffusion jet type washer nozzle jets the washings with the diffusion jet flow having the fan shape toward a sweep area of a passenger's side wiper blade. Therefore, a splashdown of the washings jetted from the directional jet flow type washer nozzle does not disturb a driver's view substantially. Moreover, on a windshield of a passenger's side, the washings are splashed down in a wide area so that washing performance of the sweep area is improved.

However, the washings are jetted locally toward the windshield of a driver's side by the directional jet flow type washer nozzle. Therefore, the washings are not supplied sufficiently in a wide area so that the driver's view is not secured. It is considered that the splashed washings on the windshield is swept and spread in the wide area by a sweeping operation of the wiper blade. However, much sweeping operation is necessitated to perform this spreading of the washings. Moreover, it is difficult to secure the driver's view rapidly.

Specifically, parallel interlock-type wiper equipment has the following problems because of its sweeping method. Here, the parallel interlock-type wiper equipment sweeps and washes a windshield of a vehicle by using washings supplied from the washer equipment. In the parallel interlock-type wiper equipment, a pair of wiper blades for sweeping both the driver's side and passenger's side windshields synchronizes and moves to the same direction so that the pair of wiper blades reciprocates and moves circularly on the windshield.

The washings splashed on the windshield are swept and spread by the parallel interlock-type wiper equipment, each wiper blade of which reciprocates and moves circularly (i.e., performs a sweeping operation) between a lower reverse position (i.e., a stop position) and an upper reverse position of the wiper blade. Thus, the windshield is swept and washed. Therefore, on the driver's side, the washings are jetted locally and concentrically so as to avoid an eye point of the driver on the windshield for securing the driver's view. It is considered that the washings splashed down locally and concentrically are swept and spread in a wide area by the wiper blade. However, the washings, which are splashed down to a certain point that is not the eye point of the driver, are not spread sufficiently so that the washings do not reach the upper reverse position. Especially, on a top end side of the wiper blade in a longitudinal direction (i.e., the upper half area of the sweep area), for example, on a portion of the windshield disposed upside of the eye point of the driver, there exists an insufficient washing portion, which is not swept and washed sufficiently. On the sweep area swept by the parallel interlock-type wiper equipment, specifically, on the driver's side sweep area, it is difficult to secure the driver's view rapidly and widely.

Moreover, when the washings are jetted by the directional jet flow type washer nozzle toward the sweeping area of the driver's side wiper blade, it is considered that the washings are splashed down directly to a certain position around the upper reverse position of the driver's side wiper blade so as to increase a washing area. In this case, the washings spread and swept by the upward sweeping operation of the driver's side wiper blade may be largely scattered out of the windshield and the like. Therefore, after the driver's side wiper blade reaches the upper reverse position, the washings cannot be used for a downward sweeping operation sufficiently. Further, to compensate this shortage of the washings, the washings are required to be jetted repeatedly. Thus, consumption of the washings increases.

Another washer equipment is disclosed in Japanese Unexamined Patent Application Publication No. 2002-67887. This washer equipment has a diffusion type jet nozzle. The diffusion type jet nozzle can jet the washings widely so that the views of a driver and a passenger are secured widely by sweeping with wiper equipment.

The washer nozzle includes a nozzle chip engaged in a nozzle body. Moreover, the nozzle chip has an oscillation chamber for self-oscillating the washings inputted into the oscillation chamber. The oscillation chamber includes a diffusion passage (i.e., a main passage) and a feed back passage. The main passage flows the washings delivered from a supply passage of the nozzle body. The feed back passage branches a part of the washings, flows and returns the washings to the main passage, and is independent from the main passage. Thus, the washings flowing through the feed back passage becomes a control flow so that the washings flowing through the main passage are self-oscillated. The self-oscillated washings are jetted as a diffusion jet flow having a fan shape. Accordingly, the washings can be jetted to a comparatively wide area.

However, even when the diffusion type jet nozzle diffusely jets the washings widely, a distribution of the diffusion jet flow of the washings is not uniformed in such a manner that an amount of the washings at both ends of the fan shape of the diffusion jet flow is larger than that at a center portion of the fan shape of the diffusion jet flow. Therefore, the washings splashed down to the windshield cannot be supplied uniformly even if the washings on the windshield is swept and spread by a wiper blade. Therefore, there may exist an insufficient washing portion in a case where muddy water adheres on the windshield. Moreover, in the diffusion type jet nozzle, the jetted washings are composed of small drops having a comparatively small diameter. Therefore, the jetted washings are easily affected by the airflow in case of the vehicle running at high speed, so that the splashdown of the washings falls down from a predetermined position. Thus, the washings cannot be supplied to an upper portion of the windshield, so that the insufficient washing portion becomes larger. Thus, the driver's view on the driver's side windshield cannot be secured widely.

Assuming that the diffusion angle of the diffusion jet flow becomes large so as to enlarge the splashdown area, the washings are flown by the outside airflow so that the washings are sprayed out to the outside of the windshield, since the jetted washings are composed of small drops having a comparatively small diameter. Therefore, the washings cannot be used for washing and sweeping.

Moreover, in the above washer nozzle, the nozzle chip is engaged in the nozzle body water-tightly. When alignment or dimensional accuracy between the nozzle body and the nozzle chip becomes wrong, the jet flow axis of the diffusion or directional jet nozzle may deviate or disperse. This deviation or dispersion of the jet flow axis causes nonconformity, that is, for example, the washings are not splashed down to a predetermined area or the jet flow does not jet with a predetermined angle.

SUMMARY OF THE INVENTION

In view of the above-described problem, it is an object of the present invention to provide washer equipment, which secures the driver's view rapidly and widely. Specifically, The washer equipment is used for parallel interlock-type wiper equipment, and supplies and splashes washings to an insufficient washing portion, which is not washed and swept sufficiently.

Washer equipment jets washings to each sweeping area of driver's side and passenger's side windshield of a vehicle, which are swept by driver's side and passenger's side wiper blades, respectively, in such a manner that they synchronize together and move to a same direction. The washer equipment includes a primary jet element and a secondary jet element.

The primary jet element splashes the washings down to a first splashdown disposed in each sweeping area of the driver's side and passenger's side wiper blades. The secondary jet element splashes the washings down to a second splashdown disposed upper side of the sweeping area of the driver's side wiper blade and disposed outside an upper reverse position of the passenger's side wiper blade.

In the above washer equipment, the primary jet element splashes the washings down to the first splashdown of each sweep area of the driver's side and the passenger's side wiper blades. The secondary jet element splashes the washings down to the second splashdown of the driver's side, which is disposed on the upper half area of the driver's side wiper blade and disposed outside the upper reverse position of the passenger's side wiper blade.

The second splashdown of the driver's side is disposed in a predetermined area disposed outside the eye point of the driver. In general, the washings, which are splashed down to this predetermined area, are not spread sufficiently so that the washings reach the upper reverse position. Especially, on a top end side of the wiper blade in a longitudinal direction of the wiper blade, there exists an insufficient washing portion, which is not swept and washed sufficiently.

However, in the above washer equipment, the secondary jet part provides the second splashdown of the washings. The second splashdown is disposed in the predetermined area, which is not swept and washed sufficiently in general. The predetermined area is disposed in a sweeping area swept by the driver's side wiper blade. Therefore, the washings are compensated and supplied sufficiently to the predetermined area, which is not swept and washed sufficiently by the primary jet part only.

In other words, considering the sweeping operation of each wiper blades, the washings are compensated and supplied to the area, which is not supplied with the washings sufficiently in general, by the secondary jet element that is separated from the primary jet element. Therefore, the sweeping area of the driver's side is swept and washed sufficiently and widely by a few sweeping operation of the wiper blade, so that the driver's view is secured widely and rapidly.

Preferably, the primary jet part is provided by driver's side and passenger's side primary jet nozzles, which are separated from each other, the driver's side primary jet nozzle jets the washings toward the first splashdown disposed in the sweeping area of the driver's side, and the passenger's side primary jet nozzle jets the washings toward the first splashdown disposed in the sweeping area of the passenger's side. More preferably, each primary jet nozzle includes a primary jet outlet for jetting a primary jet by self-oscillating the washings so as to provide a diffusion jet flow having a fan shape.

In the above washer equipment, the primary jet for splashing the washings down to the first splashdown is the diffusion jet by self-oscillating the washings so as to jet the diffusion jet flow having a fan shape. Therefore, the washings are splashed down to the windshield widely, so that the insufficient washing portion, which is not swept and washed sufficiently because of muddy water and the like, is swept and washed by the wiper blade sufficiently. Thus, the driver's view is secured widely.

Preferably, the second splashdown is disposed correspondingly to a middle portion of the first splashdown in a lateral direction. In this washer equipment, the second splashdown is disposed correspondingly to the middle portion of the first splashdown in the lateral direction of the windshield. Therefore, even when the primary jet is the diffusion jet, and a center portion of the primary jet has a small amount of the jet flow in a flow distribution of the washings, the secondary jet for splashing the washings down to the second splashdown compensates the center portion of the primary jet having a small amount of the jet flow in the flow distribution of the washings. Thus, the washing performance is further improved.

Preferably, the secondary jet part is provided by a secondary jet nozzle for jetting the washings as a directional jet flow having directivity and being jetted concentrically. This washer equipment splashes down the washings concentrically by the jet flow since the secondary jet for splashing the washings down to the second splashdown is the jet flow for jetting the secondary jet with the directional jet flow. Therefore, the secondary jet (i.e., the jet flow) concentrically splashes the washings so as to compensate the washings to an area that is not swept and washed sufficiently or an portion that has a small amount of the jet flow in the flow distribution of the jet flow pattern of the primary jet for splashing the washings down to the first splashdown. For example, when the vehicle runs at high speed, the outside air flows at high speed. Therefore, the washings jetted from the washer equipment are affected by the high speed outside airflow (i.e., the jet flow of the washings are bent so that the jet flow yields to the outside airflow). Then, the splashdown of the diffusion jet jetted from the primary jet nozzle falls down, so that the washings are not supplied more sufficiently to an upside portion around the upper half area of the sweeping area of the driver's side. However, since the jet flow jetted from the secondary jet nozzle is concentrically splashed down to the upside portion, the jet flow jetted from the secondary jet nozzle is not affected by the outside airflow substantially so that the jet flow is securely splashed down to the second splashdown, which is disposed on the predetermined position. Therefore, even when the vehicle runs at high speed, the washings can be supplied sufficiently to the upside portion, in which the washings jetted from the primary jet nozzle is not supplied more sufficiently. Thus, the splashdown area of the washings becomes wide so that the insufficient washing portion, which is not swept and washed sufficiently by the diffusion jet only, is reduced. Therefore, the washing performance is much improved.

BRIEF DESCRIPTION OF THE DRAWINGS

The above and other objects, features and advantages of the present invention will become more apparent from the following detailed description made with reference to the accompanying drawings. In the drawings:

FIGS. 7A and 7B are a schematic plan view and a schematic side view showing a distribution of a jet-flow jetted from a washer nozzle of the washer equipment according to the first embodiment, FIGS. 8A and 8B are a schematic plan view and a schematic side view showing a distribution of a diffusion jet-flow jetted from a washer nozzle without a directional jet nozzle according to a comparison of the first embodiment.

FIG. 13 is a cross-sectional view showing another washer nozzle of the washer equipment according to a modification of the fourth embodiment.

DETAILED DESCRIPTION OF THE PREFERRED EMBODIMENTS

First Embodiment

Figure 1:
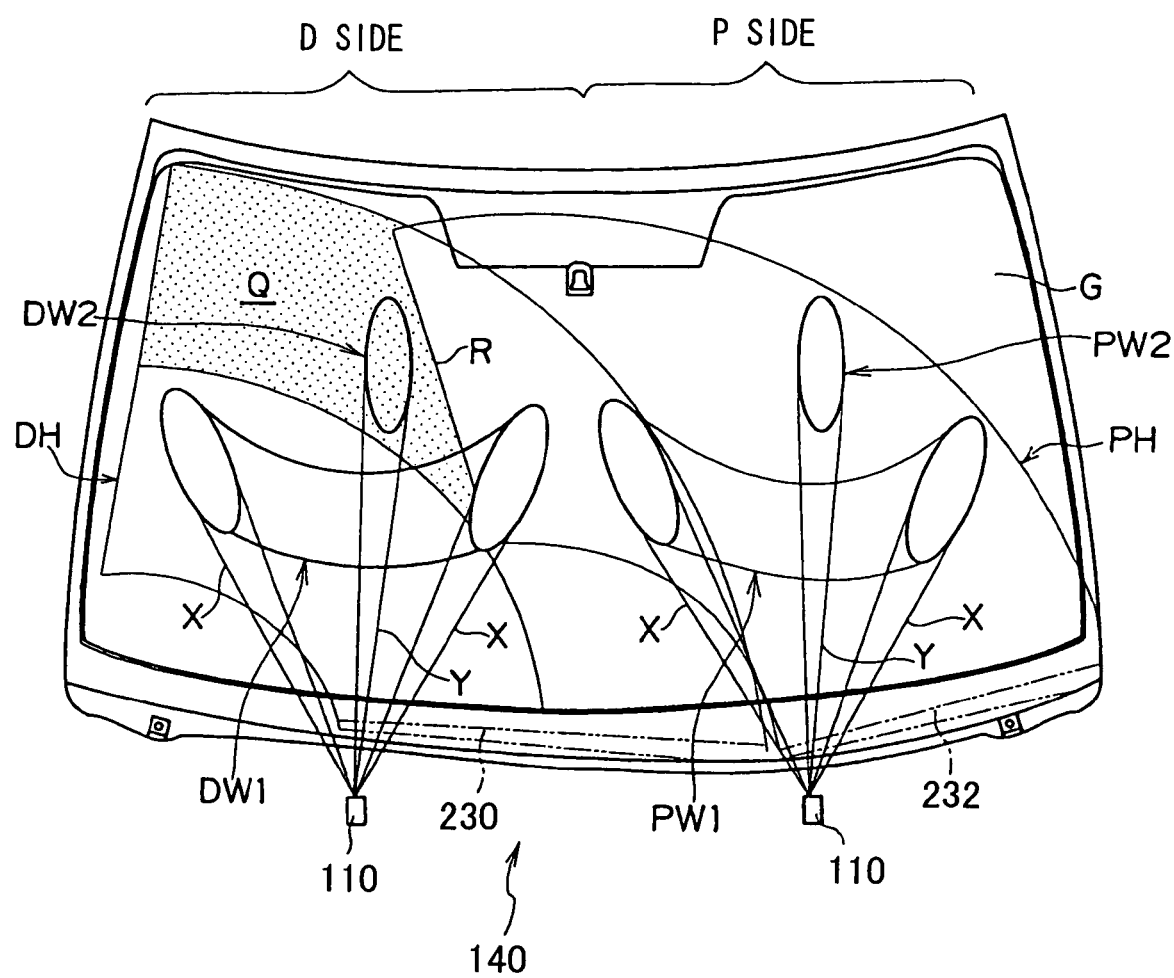
FIG. 1 is a front view showing an entire construction of washer equipment according to a first embodiment of the present invention, and also explaining a washing area of the washer equipment.
Figure 2:
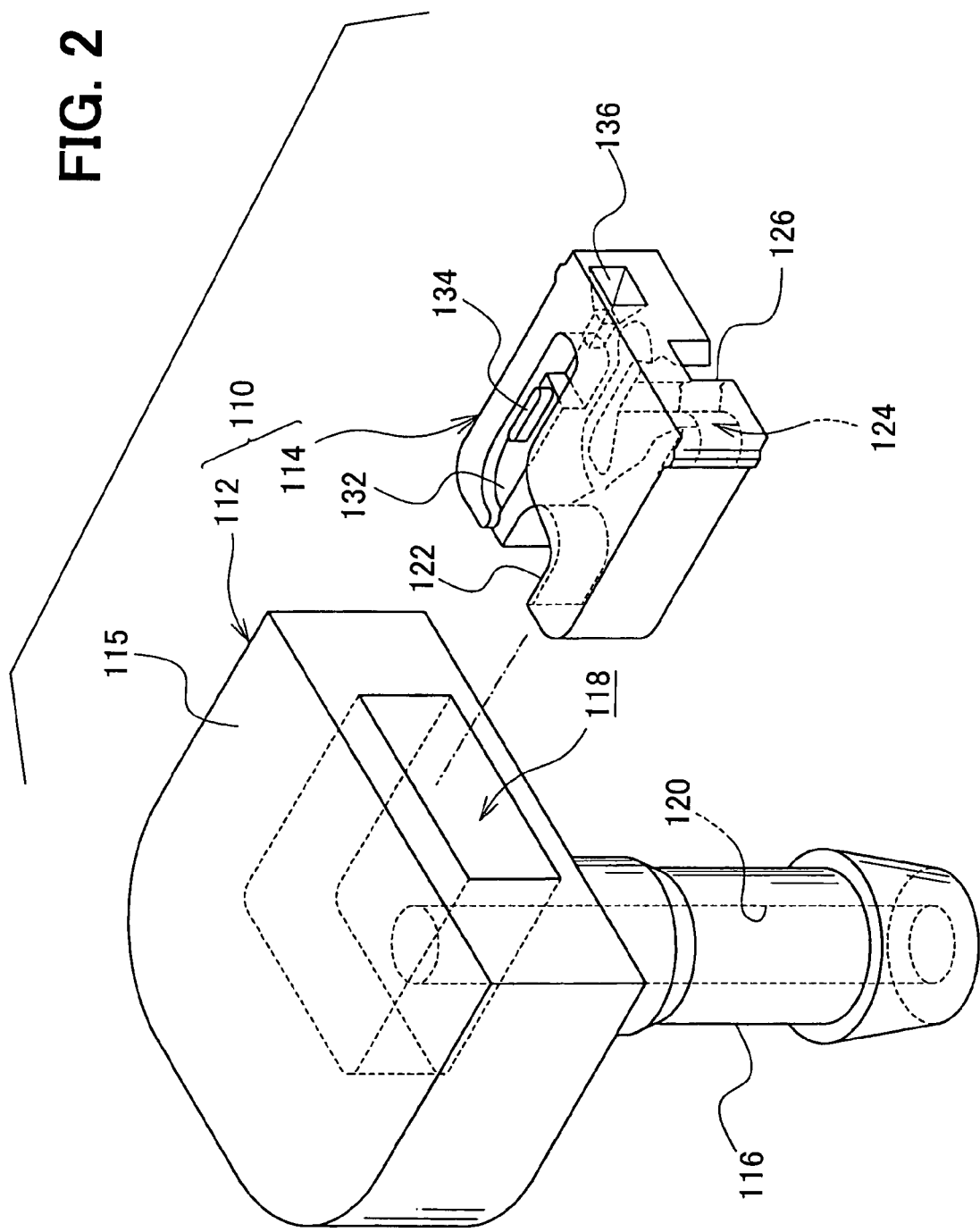
FIG. 2 is a perspective view showing a washer nozzle, according to the first embodiment.
Figure 3:
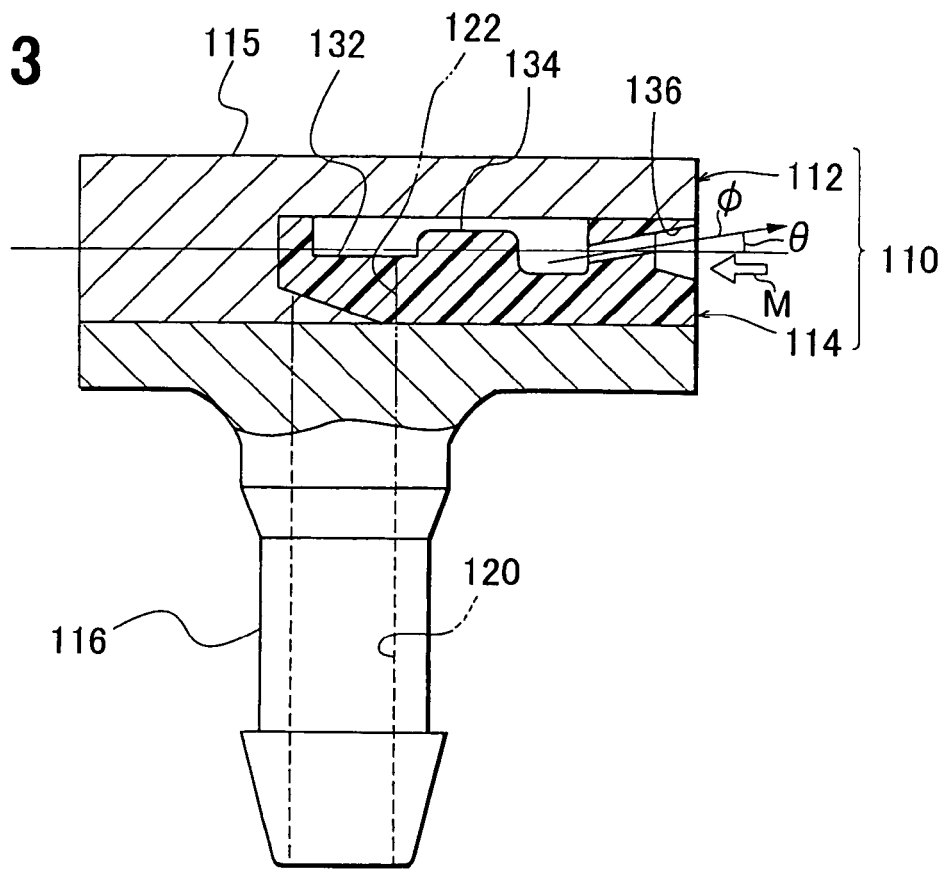
FIG. 3 is a schematic cross-sectional view showing the washer nozzle, according to the first embodiment.
Figure 4:
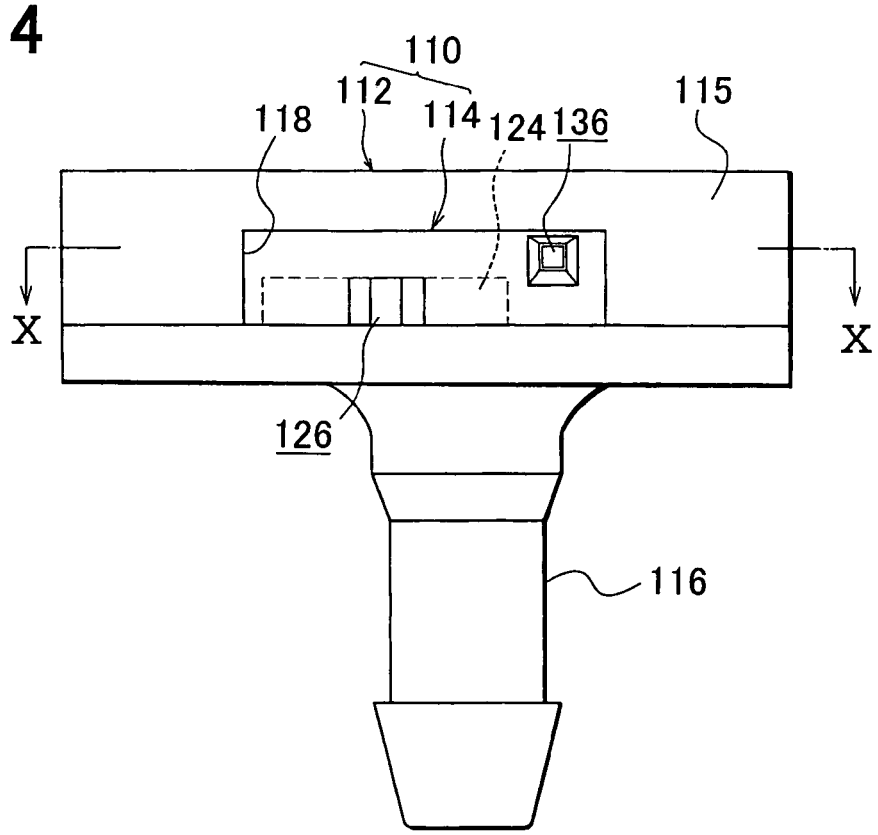
FIG. 4 is a front view showing the washer nozzle, according to the first embodiment.
Figure 5:
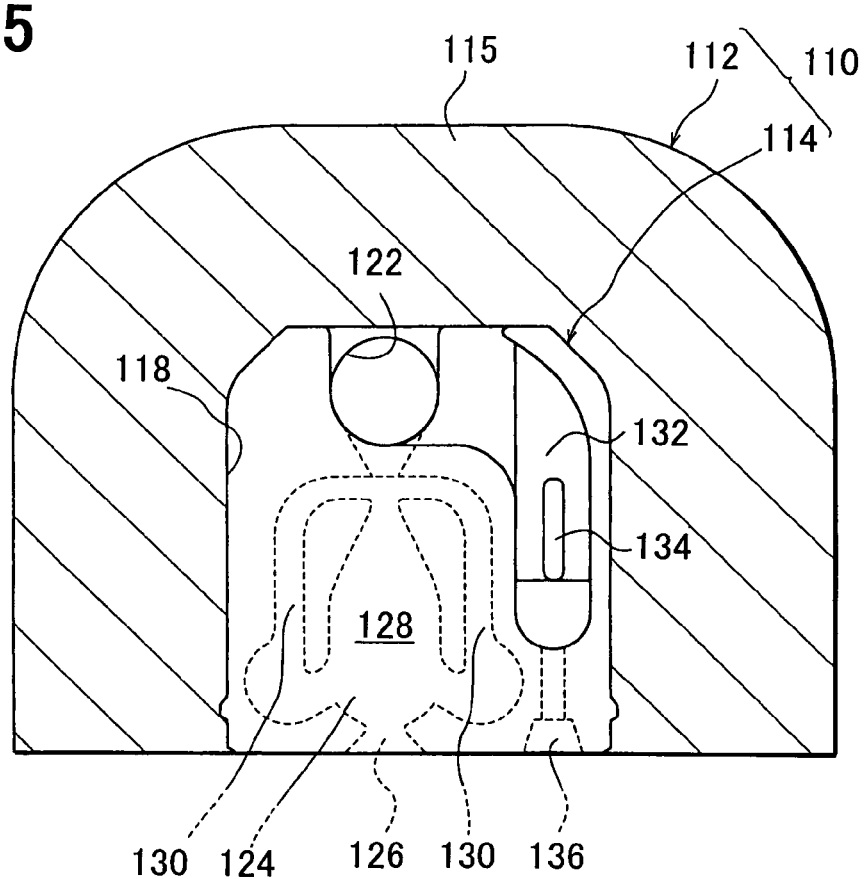
FIG. 5 is a cross-sectional view showing the washer nozzle taken along line X-X in FIG. 4, according to the first embodiment.
Figure 6:
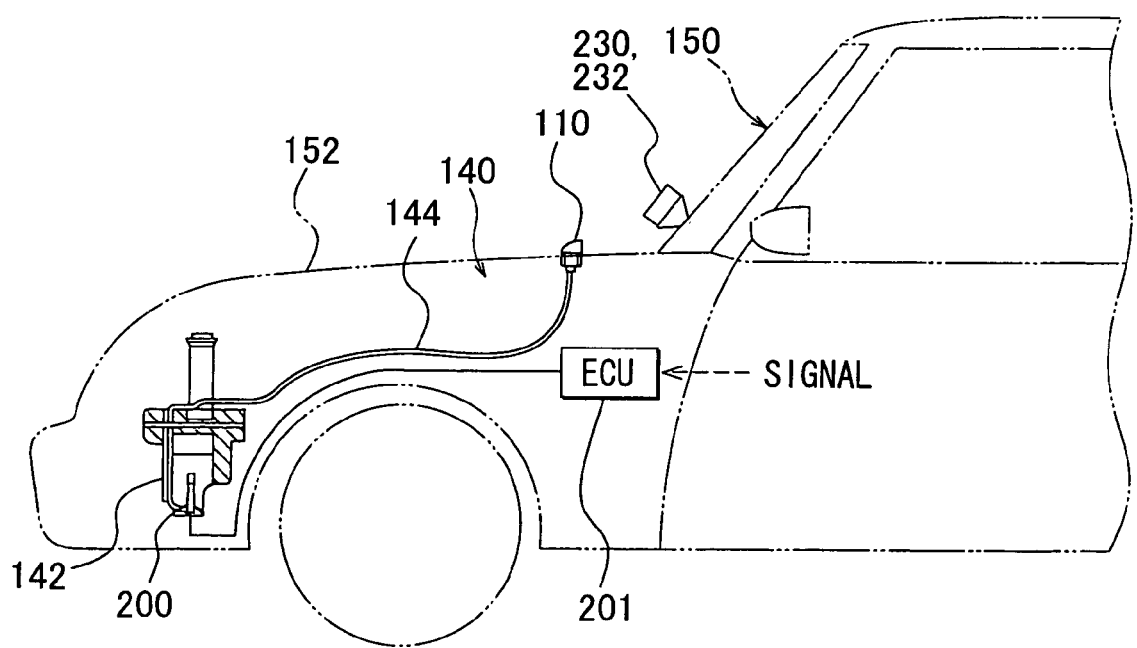
FIG. 6 is a schematic side view showing washer equipment having the washer nozzle and mounted on a vehicle, according to the first embodiment.

FIG. 1 is a front view showing an entire construction of washer equipment 140 according to a first embodiment of the present invention, and also explaining a washing area of the washer equipment 140. FIG. 2 is a perspective view showing a washer nozzle 110. FIG. 3 is a schematic cross-sectional view showing the washer nozzle 110. FIG. 4 is a front view showing the washer nozzle 110. FIG. 5 is a cross-sectional view showing the washer nozzle 110 taken along line X-X in FIG. 4. FIG. 6 is a schematic side view showing washer equipment 140 having the washer nozzle 110 and mounted on a vehicle.

As shown in FIG. 1, the washer equipment 140 includes the washer nozzle 110. The washer nozzle 110 jets washings toward a windshield G of the vehicle. The washings are splashed down to the windshield G, so that the washings are swept by parallel interlock-type wiper equipment. The wiper equipment has a pair of wiper blades 230, 232 for a driver's side and a passenger's side of the windshield G. The pair of wiper blades 230, 232 is synchronized and moves to the same direction so that the pair of wiper blades 230, 232 reciprocates and moves circularly on the windshield G. Thus, the windshield G is swept and washed so that raindrop or muddy water adhered on the windshield G are swept and washed.

As shown in FIG. 2, the washer nozzle 110 includes a nozzle body 112 and a nozzle chip 114. The nozzle body 112 is made of resin material. As shown in FIG. 6, the washer nozzle 110 is mounted such that a nozzle head 115 of the nozzle body 112 is exposed from a body panel 152 of the vehicle 150. A hose connector 116 having a cylindrical shape is disposed in a lower portion of the nozzle body 112. The hose connector 16 connects to a washings storage tank 142 with a hose 144. An electric pump 200 is disposed in the tank 142. The pump 200 connects to an electronic control unit (i.e., ECU) 201 electrically. The ECU 201 also controls the wiper equipment. When a start signal is inputted into the ECU 201, the ECU 201 controls the pump 200 to compress the washings before operating the wiper equipment. Therefore, the washer equipment jets and splashes the washings down to the windshield G. After that, the wiper equipment having the wiper blade 230, 232 sweeps the windshield G. Here, in general, the wiper blade 230, 232 stops at a lower reverse position (a stop position).

As shown in FIG. 2, a chip accommodation portion 118 is formed in the nozzle body 112, and has an opening on a front surface of the nozzle body 112. A supply passage 120 connects to the chip accommodation portion 118, and other end of the supply passage 120 reaches the hose connector 116.

A nozzle chip 114 is integrally engaged in the chip accommodation portion 118 water-tightly. The nozzle chip 114 is formed by resin molding method, and has an almost box shape. A washings flow passage 122 is formed between the chip accommodation portion 118 and the nozzle chip 114, so that the washings flow passage 122 connects to the supply passage 120 (i.e., the washings flow passage 122 composes a part of the supply passage 120).

Further, an oscillation chamber 124 and a diffusion jet nozzle 126 are formed in the lower portion of the nozzle chip 114 (that is disposed down side in FIGS. 2 and 4). The oscillation chamber 124 and the diffusion jet nozzle 126 are provided by both a surface of the nozzle chip 114 and an inner wall of the chip accommodation portion 118 in a case where the nozzle chip 114 is engaged in the chip accommodation portion 118.

As shown in FIG. 5, the oscillation chamber 124 includes a main passage 128 and a pair of feed back passages 130, in which the washings flow from the washings flow passage 122. The main passage 128 connects to both the washings flow passage 122 and the diffusion jet nozzle 126 so that the main passage 128 provides a diffusion jet passage. A pair of feed back passages 130 separates from the main passage 128 to right and left sides, respectively. A part of the washings flown from the washings flow passage 122 branches to the feed back passage 130, and then the washings returns to the main passage 128. Therefore, the washings flowing through the feed back passage 130 becomes a control flow so that the washings flowing through the main passage 128 is self-oscillated. The self-oscillated washings are jetted from the diffusion jet nozzle 126 as a diffusion jet flow having a fan shape. Accordingly, the washings can be jetted to a comparatively wide area.

On the other hand, a directional jet passage 132 is formed in the upper portion of the nozzle chip 114 (that is disposed upside in FIGS. 2 and 4). The directional jet passage 132 is provided by both the surface of the nozzle chip 114 and the inner wall of the chip accommodation portion 118 in a case where the nozzle chip 114 is engaged in the chip accommodation portion 118, similar to the oscillation chamber 124 and the diffusion jet nozzle 126, which are provided by both the surface of the nozzle chip 114 and the inner wall of the chip accommodation portion 118.

As shown in FIG. 5, the directional jet passage 132 connects to the washings flow passage 122, and can independently introduce a part of the washings delivered from the washings flow passage 122. Further, a current plate 134 is protruded in the directional jet passage 132.

A directional jet nozzle 136 is formed in the nozzle chip 114. The directional jet nozzle 136 has an opening on the front surface of the nozzle body 112, and is formed in the nozzle chip 114 itself independently from the nozzle body 112. The directional jet nozzle 136 is provided by a through hole connecting to the directional jet passage 132. In other words, the directional jet nozzle 136 is not provided by both the surface of the nozzle chip 114 and the inner wall of the chip accommodation portion 118 in a case where the nozzle chip 114 is engaged in the chip accommodation portion 118, i.e., it is different from the cases of the oscillation chamber 124, the diffusion jet nozzle 126 and the directional jet passage 132. The directional jet nozzle 136 is provided by the through hole formed in the nozzle chip 114 itself.

The directional jet nozzle 136 is disposed on a certain position, which deviates from the diffusion jet nozzle 126 along with the diffusion jet direction of the diffusion jet flow jetted from the diffusion jet nozzle 126. In detail, the certain position deviates from the diffusion jet nozzle 126 along with both a horizontal direction and a vertical direction. Therefore, the directional jet nozzle 136 jets the washings from the directional jet passage 132 as the directional jet flow independently from the diffusion jet flow jetted from the diffusion jet nozzle 126.

Specifically, as shown in FIG. 3, the directional jet nozzle 136 has a vertical angle θ in a vertical plane between the directional jet nozzle 136 and a horizontal plane. The vertical angle θ is independent from an assembling angle in a vertical direction (that is an assembling direction shown as an arrow M in FIG. 3) of the nozzle chip being engaged in the chip accommodation portion 118. In other words, the directional jet flow axis φ of the directional jet nozzle 136 is independent from the diffusion jet flow angle in the vertical plane between the horizontal plane and the diffusion jet flow jetted from the diffusion jet nozzle 126. For example, each jet nozzle 126, 136 is set up in such a manner that the directional jet flow jetted from the directional jet nozzle 136 splashes the washings down to a certain area, which is disposed upper side of the splashdown area of the washings jetted from the diffusion jet nozzle 126 as the diffusion jet flow.

As shown in FIG. 1, the washer nozzle 110 is composed of a driver's side (i.e., D side) washer nozzle and a passenger's side (P side) washer nozzle, which correspond to the driver's side and passenger's side windshield G, respectively. The driver's side washer nozzle and the passenger's side washer nozzle jet the washings toward a driver's side sweep area DH of the driver's side wiper blade 230 and a passenger's side sweep area PH of the passenger's side wiper blade 232, respectively.

The diffusion jet flow jetted from the diffusion jet nozzle 124 is "a primary jet flow X", which provides to deliver the washings to each first splashdown of the driver's side DW1 and the passenger's side PW1. Each first splashdown of the driver's side DW1 and the passenger's side PW1 is disposed on almost center of the driver's side sweep area DH of the driver's side wiper blade 230 and the passenger's side sweep area PH of the passenger's side wiper blade 232, respectively. The directional jet flow jetted from the directional jet nozzle 136 is "a secondary jet flow Y", which provides to deliver the washings to each second splashdown of the driver's side DW2 and the passenger's side PW2. Each second splashdown of the driver's side DW2 and the passenger's side PW2 is disposed upside of the first splashdown of the driver's side DW1 and the passenger's side PW1, respectively. The directional jet flow jetted from the directional jet nozzle 136 is independent from the diffusion jet flow jetted from the diffusion jet nozzle 126. Thus, a splashdown area of the washings jetted from the washer nozzle 110 is determined.

Further, the second splashdown of the driver's side DW2 of the secondary jet flow Y corresponding to the driver's side sweep area DH of the driver's side wiper blade 230 is disposed on a top end side of the sweeping area of the driver's side wiper blade 230 in a longitudinal direction of the driver's side wiper blade 230, and disposed outside of the upper reverse position R of the passenger's side wiper blade 232 (This area is shown as Q in FIG. 1).

Preferably, each second splashdown of the driver's side DW2 and the passenger's side PW2 is disposed upside of the center of each first splashdown of the driver's side DW1 and the passenger's side PW1 in the lateral direction of the windshield G, respectively.

Next, operation of the washer nozzle 110 according to the first embodiment is described as follows.

In the washer nozzle 110 (i.e., the washer equipment 140), the washings are delivered and compressed from the washings storage tank 142 to the hose connector 116 of the nozzle body 112 with the hose 144. Then, the washings are delivered to the oscillation chamber 124 of the nozzle chip 114 through the supply passage 120 and the washings flow passage 122. Further, a part of the washings delivered from the washings flow passage 122 is branched to the feed back passage 130, and then the washings are returned to the main passage 128. Therefore, the washings flowing through the feed back passage 130 becomes a control flow so that the washings flowing through the main passage 128 is self-oscillated. The self-oscillated washings are jetted from the diffusion jet nozzle 126 as the diffusion jet flow having a fan shape.

Moreover, simultaneously, a part of the washings delivered from the washings flow passage 122 is introduced into the directional jet passage 132 of the nozzle chip 114, so that the washings are jetted from the directional jet nozzle 136. In other words, the directional jet flow jetted from the directional jet nozzle 136 is a jet flow having directivity, which is independent from the diffusion jet flow jetted from the diffusion jet nozzle 126.

In the washer equipment 140, the diffusion jet flow having a fan shape jetted from the diffusion jet nozzle 126 splashes the washings widely, and the directional jet flow jetted from the directional jet nozzle 136 splashes the washings concentrically.

In the washer equipment 140, the primary jet flow X is jetted such that the washings are splashed down to each first splashdown of the driver's side DW1 and the passenger's side PW1, each of which is disposed in the driver's side sweep area DH of the driver's side wiper blade 230 and the passenger's side sweep area PH of the passenger's side wiper blade 232, respectively. The secondary jet flow Y is jetted such that the washings are splashed down to each second splashdown of the driver's side DW2 and the passenger's side PW2, each of which is disposed upside of the first splashdown of the driver's side DW1 and the passenger's side PW1, respectively. Here, the secondary jet flow Y is independent from the primary jet flow X. Specifically, the secondary jet flow Y corresponding to the driver's side sweep area DH of the driver's side wiper blade 230 is jetted such that the washings are splashed down to the second splashdown of the driver's side DW2, which is disposed on the top end side of the driver's side sweeping area DH of the driver's side wiper blade 230 in a longitudinal direction of the driver's side wiper blade 230, and disposed outside of the upper reverse position R of the passenger's side wiper blade 232 (i.e., the area Q shown in FIG. 1).

The above area Q, in which the second splashdown of the driver's side DW2 is disposed, is disposed in the predetermined area outside the eye point of the driver in the parallel interlock-type wiper equipment. In general, since the washings jetted as the primary jet flow X is splashed downward so as to avoid the eye point of the driver, the splashed washings on the windshield G is not spread sufficiently so that the washings reach the upper reverse position of the driver's side wiper blade 230. Especially, on the top end side of the driver's side wiper blade 230 in the longitudinal direction of the windshield G, there exists an insufficient washing portion, which is not swept and washed sufficiently.

However, in the washer equipment 140, the washings are supplied to the second splashdown of the driver's side DW2 by the secondary jet flow Y. The second splashdown of the driver's side DW2 is disposed in the above area Q, which is the insufficient washing portion. Here, the above area Q is disposed in the sweeping area of the parallel interlock-type wiper equipment. The washings can be supplied sufficiently to the area Q, in which the washings are not sufficiently supplied by the primary jet flow Y only.

In other words, considering the sweeping operation of the parallel interlock-type wiper equipment, the washings are compensated and supplied by the secondary jet that is separated from the primary jet to the area Q, which is not supplied with the washings sufficiently by the primary jet only. Therefore, the sweeping area of the driver's side DH is swept and washed sufficiently and widely by a few sweeping operation of the wiper blades 230, 232, so that the driver's view is secured widely and rapidly.

Moreover, the secondary jet compensates the primary jet by jetting concentrically with a comparative small amount of the washings smaller than that of the primary jet. Therefore, the washings can be used effectively and not be wasted, so that the washings are supplied moderately not excessively. Moreover, a drip or a scattering (i.e., the washings are scattered by the wiper blade with an upward sweeping operation) of the washings according to an excess supply of the washings is limited to occur.

Further, the washings splashed down to the windshield G is spread between the lower reverse position (the stop position) and the upper reverse position of each wiper blade 230, 232 in the parallel interlock-type wiper equipment by reciprocating and moving circularly (i.e., the sweeping operation) on the windshield G with each wiper blade 230, 232. Thus, the windshield G is swept and washed. The washings, which is swept and spread by the upward sweeping operation of the passenger's side wiper blade 232, stays around the upper reverse position R of the passenger's side wiper blade 232. Then, the stayed washings are swept and spread to the lower reverse position of the driver's side wiper blade 230 by the downward sweeping operation of the driver's side wiper blade 230. In other words, the stayed washings stayed around the upper reverse position R of the passenger's side wiper blade 232 can be used effectively in a case where the driver's side wiper blade 230 performs the downward sweeping operation. Therefore, the washings are supplied sufficiently to a portion, which is disposed around the lower reverse position of the driver's side wiper blade 230 and disposed on the top end side of the driver's side sweeping area DH. Thus, in the sweeping area of the parallel interlock-type wiper equipment, specifically, in the driver's side sweep area DH, the driver's view can be secured widely and rapidly.

Moreover, in the washer equipment 140 according to this embodiment, the primary jet for jetting the washings toward each first splashdown of the driver's side DW1 and the passenger's side PW1 is the diffusion jet flow, which is provided by the self-oscillated washings and has a fan shape diffusion jet. Therefore, the washings can be splashed down to the windshield G widely. Specifically, the driver's side wiper blade 230 sweeps and washes the windshield G so that the insufficient washing portion provided by adherence of muddy water is reduced. Thus, the driver view is secured widely.

The secondary jet for the second splashdowns of the driver's side DW2 and the passenger's side PW2 is the directional jet flow, which has directivity, so that the washings can be splashed down concentrically. Therefore, even if the splashdown area of the washings by the primary jet is affected by the high speed outside airflow (i.e., the jet flow of the washings are bent so that the jet flow yields to the outside airflow) so that the splashdown area falls down when the vehicle runs at high speed, the secondary jet can compensates the washings by splashing down to an upside portion concentrically. Moreover, after being splashed down, the splashed washings jetted from the secondary jet is raised upward and spread by the high speed outside airflow, since film thickness of the splashed washings are thick. Therefore, the splashdown area can be secured widely, so that insufficient washing portion, which is not swept and washed sufficiently, becomes small. Thus, the washing performance of the washer equipment 140 is improved.

In this embodiment, the second splashdown of the driver's side DW2 and the passenger's side PW2 by the secondary jet flow Y are disposed upside of the center of each first splashdown of the driver's side DW1 and the passenger's side PW1 in the lateral direction of the windshield G, respectively. Here, FIGS. 7A and 7B are a schematic plan view and a schematic side view showing a distribution of a jet-flow jetted from the washer nozzle 110 of the washer equipment 140 according to the first embodiment. FIGS. 8A and 8B are a schematic plan view and a schematic side view showing a distribution of a diffusion jet-flow jetted from a washer nozzle without the directional jet nozzle 152 according to a comparison of the first embodiment. As shown in FIGS. 8A and 8B, even if the jet flow pattern of the diffusion jet flow from the diffusion jet nozzle 126 has a portion with a small amount of the washings in the distribution of the diffusion jet flow (i.e., a center portion A in the lateral direction), the secondary jet flow Y, which is provided by the secondary jet and jets toward the second splashdown of the driver's side DW2 and the passenger's side PW2, compensates an inhomogeneous distribution of the diffusion jet flow (i.e., the uneven distribution of the diffusion jet flow) caused by the primary jet flow X jetted from the diffusion jet nozzle 126, as shown in FIGS. 7A and 7B. Thus, the washing performance of the washer equipment 140 is further improved.

Further, the current plate 134 is protruded in the directional jet passage 132, so that the washings delivered from the supply passage 120 is preliminary rectified by the current plate 134. Therefore, the directional jet flow jetted from the directional jet nozzle 136 can splash the washings down to the predetermined splashdown area accurately. In other words, the directional jet flow having directivity can be jetted concentrically from the directional jet nozzle 136 accurately.

Further, the directional jet nozzle 136 is formed in the nozzle chip 114 independently from the diffusion jet nozzle 126. The directional jet nozzle 136 is disposed on a certain position, which deviates from the diffusion jet nozzle 126 along with the diffusion jet direction of the diffusion jet flow jetted from the diffusion jet nozzle 126 (i.e., the certain position deviates from the diffusion jet nozzle 126 along with the horizontal direction). Therefore, the jet flow angle of the directional jet flow jetted from the directional jet nozzle 136 can be set up such that the directional jet flow is independent from the diffusion jet flow jetted from the diffusion jet nozzle 126. For example, the directional jet flow can be set not to be affect by the diffusion jet flow jetted from the diffusion jet nozzle 126 (i.e., the directional jet flow and the diffusion jet flow do not intersect each other), or the directional jet flow and the diffusion jet flow systematically intersect each other. Thus, degree of freedom of jet flow pattern is improved.

Accordingly, the directional jet flow jetted from the directional jet nozzle 136 splashes the washings concentrically so as to compensate the washings to a certain portion, that is, for example, a portion having a small amount of the washing in the diffusion jet flow distribution of the diffusion jet flow jetted from the diffusion jet nozzle 126, or an insufficient washing portion, in which the splashdown of the washings falls down and the washings are short since the diffusion jet flow is affected by the outside airflow in case of the vehicle running at high speed (i.e., the diffusion jet flow is bent so that the diffusion jet flow yields to the outside airflow). Therefore, a small amount of the washings can be splashed down to a predetermined area in a short time, so that the driver's and the passenger's views are secured widely and rapidly by sweeping with the wiper equipment.

As shown in FIG. 1, the washer equipment 140 has a pair of washer nozzle 110, which are disposed on the driver side D and the passenger side P, respectively. The diffusion jet flow as the primary jet flow X jetted from the diffusion jet nozzle 126 splashes the washings down to the center portion of the sweeping area of the wiper blade 230, 232. The directional jet flow as the secondary jet flow Y jetted from the directional jet nozzle 136 splashes the washings down to a portion, which is disposed upside of the center portion. The directional jet flow is independent from the diffusion jet flow. In this case, even when the splashdown of the washings jetted from the diffusion jet nozzle 126 as the diffusion jet flow falls down since the diffusion jet flow is affected by the outside airflow in case of the vehicle running at high speed (i.e., the diffusion jet flow is bent so that the diffusion jet flow yields to the outside airflow), the directional jet flow jetted from the directional jet nozzle 136 splashes the washings concentrically down to the portion, which is disposed upside of the center portion. Thus, the directional jet flow is not affected by the outside airflow, so that the directional jet flow splashes the washings down to the predetermined area accurately. Further, assuming that the splashdown of the washings jetted from the directional jet nozzle 36 as the directional jet flow falls down although the directional jet flow is not affected by the outside airflow substantially, the washings splashed on the windshield G are pushed up and spread upward by the high speed outside airflow along with the slope of the windshield G since the washings is splashed down concentrically on the windshield G. Accordingly, the splashdown area is secured widely, so that the insufficient washing portion is reduced and the driver's and the passenger's views are secured widely.

When a portion having a small amount of the washing in the jet flow distribution of the diffusion jet flow jetted from the diffusion jet nozzle 126 (e.g., a center portion in the horizontal direction) exists, the directional jet flow jetted as the secondary jet flow Y from the directional jet nozzle 136 is set to splash the washings down to the portion having a small amount of the washings in the diffusion jet flow distribution of the diffusion jet flow jetted from the diffusion jet nozzle 126, so that the directional jet flow compensates the jet flow pattern (i.e., the uneven distribution of the diffusion jet flow) of the diffusion jet flow jetted from the diffusion jet nozzle 126. Therefore, the washing performance of the wiper equipment is improved in a wider area.

Further, the diffusion angle of the diffusion jet flow is not simply enlarged so as to enlarge the splashdown area of the washings, but the directional jet flow supplies the washings concentrically to the insufficient washing portion, which is short of the washings. Therefore, a part of the washings as the directional jet flow is limited to spray out to the outside of the windshield by the outside airflow, so that the washings can be used effectively. Therefore, a small amount of the washings can be splashed down to a predetermined area in a short time, so that the driver's and the passenger's views are secured widely and rapidly by sweeping with the wiper equipment.

In the washer nozzle 110, both the surface of the nozzle chip 114 and the inner wall of the chip accommodation portion 118 of the nozzle body 112 provide the diffusion jet nozzle 126, the main passage 128 having the oscillation chamber 124 and composing the diffusion jet passage, the feed back passage 130, and the directional jet passage 132. On the other hand, the directional jet nozzle 136 is provided by the through hole, which is formed in the nozzle chip 114 independently from the nozzle body 112 and connects to the directional jet passage 132.

In other words, the diffusion jet flow as the primary jet and the directional jet flow as the secondary jet are provided such that both the surface of the nozzle chip 114 and the inner wall of the chip accommodation portion 118 provide the diffusion jet nozzle 126, the main passage 128 having the oscillation chamber 124, the feed back passage 130, and the directional jet passage 132 so as to simplify the manufacturing process of complicated passages (e.g., the diffusion jet passage such as the main passage 128 having the oscillation chamber 124). Since the directional jet nozzle 136 for jetting the directional jet flow concentrically to the splashdown area is required for directivity, the directional jet nozzle 136 is not provided by both the surface of the nozzle chip 114 and the inner wall of the chip accommodation portion 118, but the directional jet nozzle 136 is provided by the through hole, which is formed in the nozzle chip 114 independently from the nozzle body 112.

Accordingly, the directional jet flow jetted from the directional jet nozzle 136 is not affected by alignment or dimensional accuracy between the inner wall of the chip accommodation portion 118 and the surface of the nozzle chip 114. The jet flow axis of the directional jet nozzle 136 is limited to deviate or disperse. Therefore, the directional jet flow jetted from the directional jet nozzle 136 can be splashed down to the predetermined area accurately. Further, the driver's view is not hindered. Further, the jet flow axis φ of the directional jet flow jetted from the directional jet nozzle 136 can be set up by adjusting the nozzle chip 114 only. Therefore, the jet flow axis φ can be set to any jet flow angle without being restricted by the assembling direction M (i.e., the assembling angle in the vertical plane) between the nozzle chip 114 and the chip accommodation portion 118. Moreover, the diffusion jet nozzle 126 and the directional jet nozzle 136 are formed in the nozzle chip 114. Therefore, the directional jet flow angle of the directional jet nozzle 136 in relation to the diffusion jet nozzle 126 can be set up by adjusting the nozzle chip 114 only, so that the predetermined splashdown area of the secondary jet flow Y in relation to the primary jet flow X can be set up accurately.

In the washer nozzle 110, the current plate 134 is protruded in the directional jet passage 132 so that the washings delivered from the supply passage are preliminary rectified by the current plate 134 in the directional jet passage 132. Therefore, the directional jet flow jetted from the directional jet nozzle 136 can splash the washings down to the predetermined area accurately. In other words, the directional jet flow having directivity and jetted concentrically can jet from the directional jet nozzle 136 accurately.

In this embodiment, the primary jet for jetting the washings as the diffusion jet flow toward the first splashdowns of the driver's side DW1 and the passenger's side PW1, and the secondary jet for jetting the washings as the directional jet flow toward the second splashdowns of the driver's side DW2 and the passenger's side PW2 are provided by a single washer nozzle 110. However, the secondary jet for jetting the washings toward the second splashdowns of the driver's side DW2 and the passenger's side PW2 can be provided by another washer nozzle, which is independent from the washer nozzle 110 for providing the primary jet.

In this embodiment, the primary jet for jetting the washings toward the first splashdowns of the driver's side DW1 and the passenger's side PW1 is provided by the diffusion jet nozzle 126 of the washer nozzle 110 to jet the diffusion jet having a fan shape. However, the primary jet can be provided by the directional jet flow, which has directivity and is similar to the directional jet flow of the secondary jet.

Although the washer nozzle 110 is mounted such that the nozzle head 115 of the nozzle body 112 is exposed from the body panel 152 of the vehicle 150, the washer nozzle 110 (i.e., the nozzle body 112) can be disposed downside of a rear end of an engine food (i.e., disposed back side of the engine food).

Second Embodiment

Figure 9:
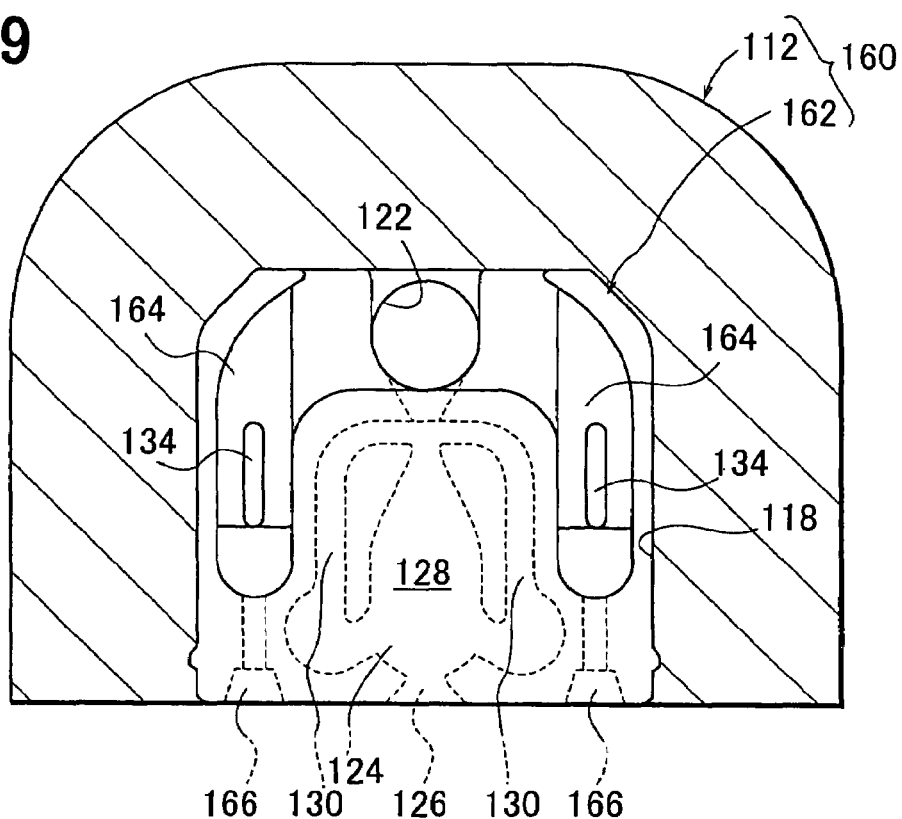
FIG. 9 is a schematic cross-sectional view showing a washer nozzle, according to a second embodiment of the present invention.
Figure 10:
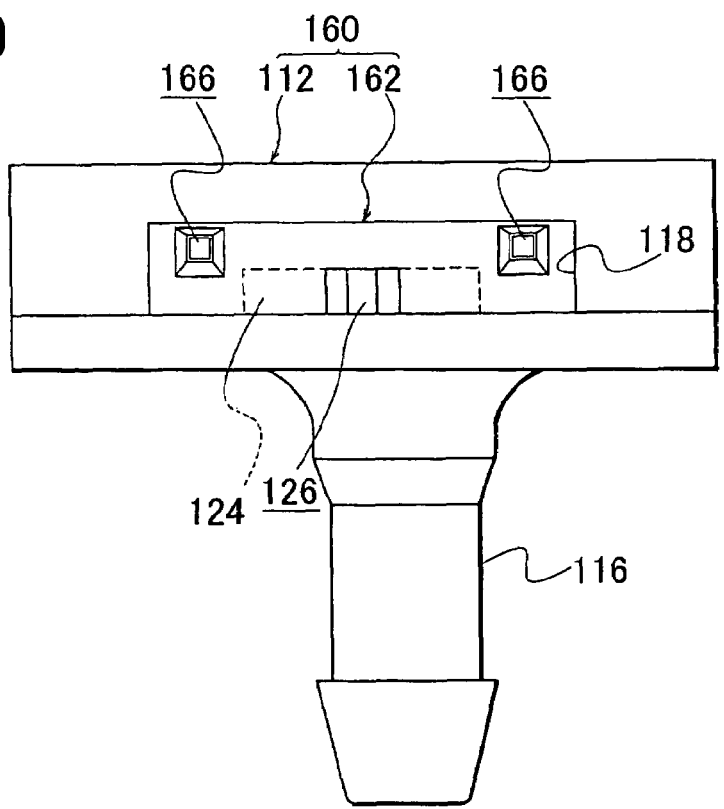
FIG. 10 is a front view showing the washer nozzle, according to the second embodiment.

FIG. 9 is a schematic cross-sectional view showing a washer nozzle 160 according to a second embodiment of the present invention. FIG. 10 is a front view showing the washer nozzle 160.

The washer nozzle 160 includes a nozzle chip 162. The nozzle chip 162 has almost the same construction as the nozzle chip 114 of the washer nozzle 110 shown in FIGS. 2-5. However, the nozzle chip 162 has a pair of directional jet passages 164 disposed upper surface of the nozzle chip 162. These directional jet passages 164 branch from the washings flow passage 122, and are provided by both a surface of the nozzle chip 162 and the inner wall of the chip accommodation portion 118 in a case where the nozzle chip 162 is engaged in the chip accommodation portion 118.

A pair of directional jet nozzles 166 is formed in the nozzle chip 162. These directional jet nozzles 166 are formed in the nozzle chip 162 itself, and independent from the nozzle body 112. Each directional jet nozzle 166 has an opening on the front surface of the nozzle body 112, and is provided by a through hole connecting to the directional jet passage 164. Each directional jet nozzle 166 is not provided by both the surface of the nozzle chip 162 and the inner wall of the chip accommodation portion 118 in a case where the nozzle chip 162 is engaged in the chip accommodation portion 118, but the directional jet nozzle 166 is provided by the through hole, which is formed in the nozzle chip 162.

In the washer nozzle 160, a pair of secondary jet flows Y jetted from a pair of the directional jet nozzles 166 is provided in addition to the primary jet flow X jetted from the diffusion jet nozzle 126. Therefore, the washings can be concentrically and accurately supplied to a plurality of insufficient washing portions, which are short of the washings. Thus, the washer nozzle 160 works efficiently.

In other words, the washer equipment can have a plurality of secondary jet flows jetted from a plurality of through holes of the directional jet nozzle in addition to the primary jet flow jetted from the diffusion jet nozzle. Therefore, the washings can be concentrically and accurately supplied to a plurality of insufficient washing portions, which are short of the washings.

Third Embodiment

Figure 11:
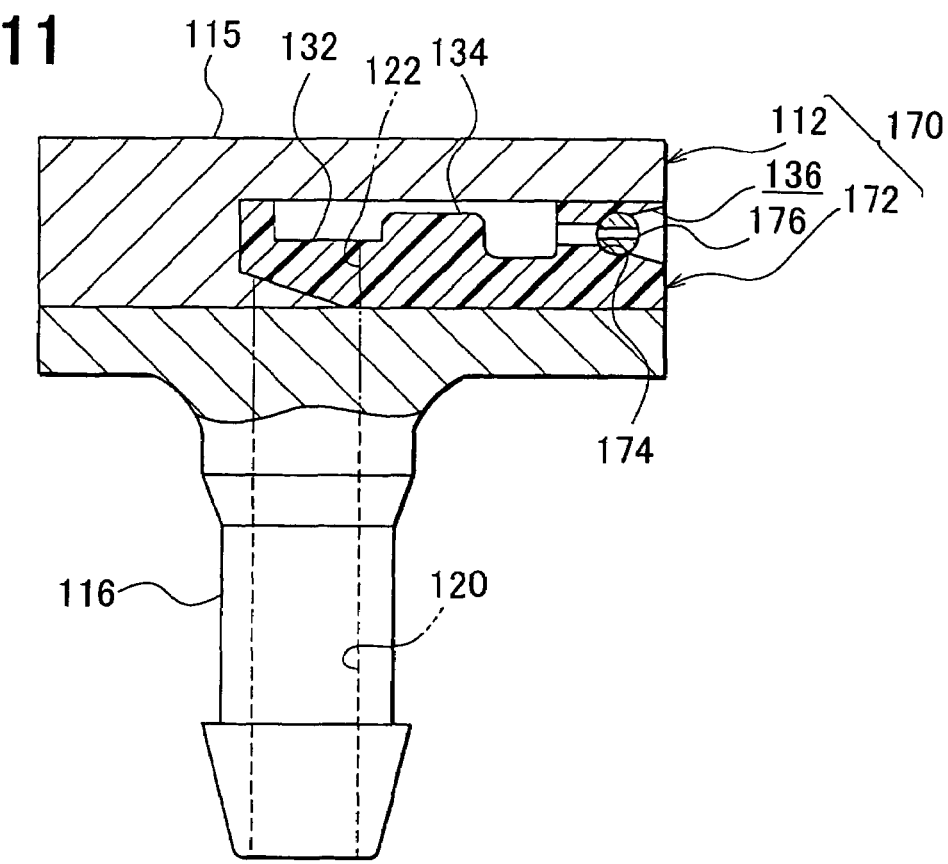
FIG. 11 is a schematic cross-sectional view showing a washer nozzle, according to a third embodiment of the present invention.

FIG. 11 is a schematic cross-sectional view showing a washer nozzle 170 according to a third embodiment of the present invention.

The washer nozzle 170 includes a nozzle chip 172. The nozzle chip 172 has almost the same construction as the nozzle chip 114 of the washer nozzle 110 shown in FIGS. 2-5. However, a concavity 174 is formed on the directional jet nozzle 172 (i.e., the through hole). A nozzle jet 176 is rotatably engaged in the concavity 174.

In the washer nozzle 170, the nozzle jet 176 is rotatably engaged in the concavity 174 formed in the directional jet nozzle 136 (i.e., the through hole) of the nozzle chip 172. Therefore, the alignment of the nozzle jet 176 can be changed, so that user of the vehicle can adjust the alignment of the nozzle jet 176 so as to adjust the splashdown area of the directional jet flow jetted from the directional jet nozzle 136. Accordingly, the predetermined splashdown area of the secondary jet flow Y can be adjusted independently in relation to the primary jet flow X. Specifically, the directional jet flow angle of the directional jet nozzle 136 can be adjusted independently from the diffusion jet flow angle of the diffusion jet nozzle 126.

Fourth Embodiment

Figure 12:
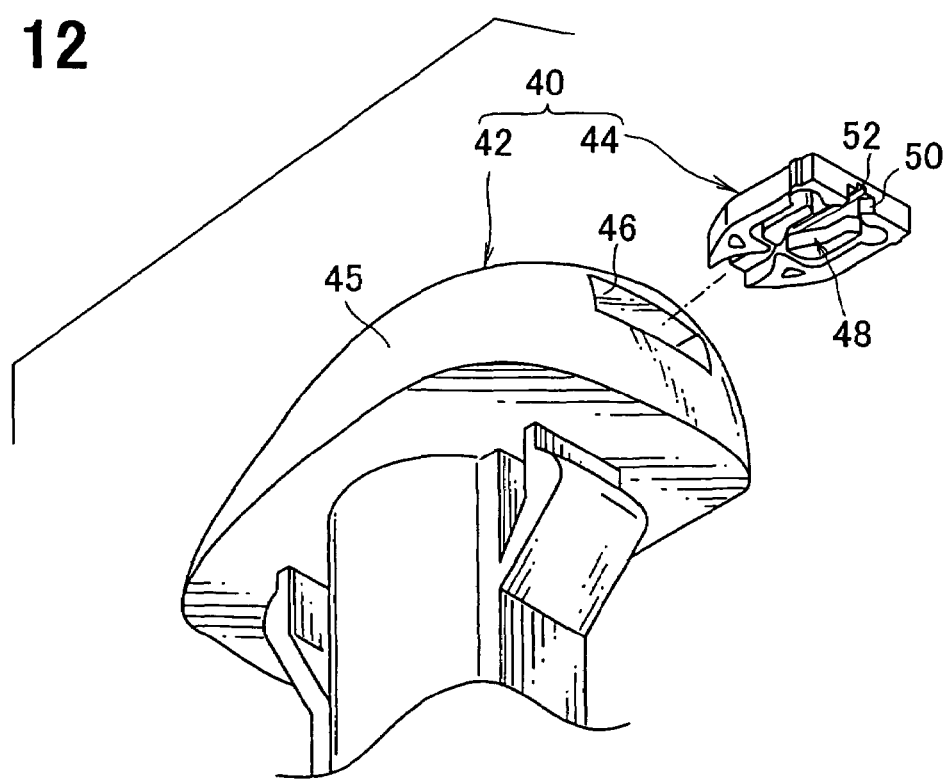
FIG. 12 is a perspective view showing the washer nozzle of the washer equipment according to a fourth embodiment.

FIG. 12 is a perspective view showing a washer nozzle 40 of washer equipment 10 according to a fourth embodiment of the present invention. The washer nozzle 40 includes a nozzle body 42 and a nozzle chip 44. The nozzle body 42 is mounted such that a nozzle head 45 of the nozzle body 42 is exposed from a body panel of the vehicle. A lower side of the nozzle body 42 connects to a hose (not shown). The hose connects to a washings storage tank for storing the washings.

The nozzle body 42 further includes a chip accommodation portion 46 having an opening on a front surface of the nozzle body 42. The nozzle chip 44 is engaged in the chip accommodation portion 46 integrally and water-tightly. The lower side of the nozzle chip 44 includes an oscillation chamber 48 and a diffusion jet nozzle 50. The washings inputted into the oscillation chamber 48 are self-oscillated, so that the self-oscillated washings are jetted from the diffusion jet nozzle 50. The diffusion jet nozzle 50 jets the washings as a diffusion flow having a fan shape. Therefore, the washings can be jetted to a comparatively wide area, so that the washing area is increased.

The nozzle chip 44 further includes a directional jet nozzle 52. The directional jet nozzle 52 jets the washings inputted into the nozzle 52 as a directional jet flow, which is independent from the diffusion jet flow jetted from the diffusion jet nozzle 50. In the fourth embodiment, the directional jet nozzle 52 and the diffusion jet nozzle 50 are formed integrally, i.e., they connect each other.

Operation of the equipment according to the fourth embodiment is described as follows.

In the washer equipment 10, the washings are compressed and delivered from the tank to the washer nozzle 40. Then, the washings flows into the oscillation chamber 48 of the nozzle chip 44 of the washer nozzle 40, so that the washings are self-oscillated. The self-oscillated washings are jetted as the diffusion jet flow having a fan shape from the diffusion jet nozzle 50. Moreover, simultaneously, a part of the washings delivered into the nozzle chip 44 is jetted as a directional jet flow from the directional jet nozzle 52. In other words, the directional jet flow jetted from the directional jet nozzle 52 passes through a directional jet flow passage disposed adjacent to the oscillation chamber 48. Therefore, the directional jet flow jetted from the directional jet nozzle 52 does not pass through the oscillation chamber 48 so that the directional jet flow is not self-oscillated. Therefore, the directional jet flow has directivity and is independent from the diffusion jet flow jetted from the diffusion jet nozzle 50. Thus, the washer equipment 10 provides both the diffusion jet flow and the directional jet flow using the washer nozzle 40. The diffusion jet flow having a fan shape is jetted from the diffusion jet nozzle 50 so that the washings are splashed down widely. Moreover, the directional jet flow having directivity is jetted from the directional jet nozzle 52 so that the washings are splashed down concentrically.

Moreover, the nozzle body 42 of the washer nozzle 40 is mounted on the body panel of the vehicle so as to expose the nozzle head 45. However, as shown in FIG. 13, the nozzle body 42 can be disposed downside of the rear end of an engine food F (i.e., disposed back side of the engine food F).

Such changes and modifications are to be understood as being within the scope of the present invention as defined by the appended claims.

What is claimed is:

1. Washer equipment for jetting washings to each sweeping area of driver's side and passenger's side windshield of a vehicle, which are swept by driver's side and passenger's side wiper blades, respectively, in such a manner that they synchronize together and move to a same direction, the washer equipment comprising a primary jet element and a secondary jet element, wherein the primary jet element splashes the washings down to a first splashdown disposed in each sweeping area of the driver's side and passenger's side wiper blades, the secondary jet element splashes the washings down to a second splashdown disposed upper side of the sweeping area of the driver's side wiper blade and disposed outside an upper reverse position of the passenger's side wiper blade, the primary jet element is provided by driver's side and passenger's side primary jet nozzles, which are separated from each other, the driver's side primary jet nozzle jets the washings toward the first splashdown disposed in the sweeping area of the driver's side, the passenger's side primary jet nozzle jets the washings toward the first splashdown disposed in the sweeping area of the passenger's side, each primary jet nozzle includes a primary jet outlet for jetting a primary jet by self-oscillating the washings so as to provide a diffusion jet flow having a fan shape, and the second splashdown is disposed correspondingly to a middle portion of the first splashdown in a lateral direction of the windshield.

2. The washer equipment according to claim 1, wherein the secondary jet element is provided by a secondary jet nozzle for jetting the washings as a directional jet flow having directivity and being jetted concentrically.

3. The washer equipment according to claim 1, wherein the secondary jet element is provided by a secondary jet nozzle, which is independent from the primary jet element for providing the primary jet.

4. The washer equipment according to claim 1, wherein the primary and secondary jet elements splash the washings before a sweeping operation of each wiper blade in a case where both the driver's and passenger's wiper blades stop at a lower reverse position.

5. Washer equipment for jetting washings to each sweeping area of driver's side and passenger's side windshield of a vehicle, which are swept by driver's side and passenger's side wiper blades, respectively, in such a manner that they synchronize together and move to a same direction, the washer equipment comprising a primary jet element and a secondary jet element, wherein the primary jet element splashes the washings down to a first splashdown disposed in each sweeping area of the driver's side and passenger's side wiper blades, the secondary jet element splashes the washings down to a second splashdown disposed upper side of the sweeping area of the driver's side wiper blade and disposed outside an upper reverse position of the passenger's side wiper blade, at least the primary and secondary jet elements of the driver's side are provided by a single washer nozzle, the single washer nozzle includes a nozzle body mounted on the vehicle and having a chip accommodation portion, a nozzle chip engaged in the chip accommodation portion water-tightly, a diffusion jet nozzle for jetting the washings as a primary jet, which is a diffusion jet flow diffused in a lateral direction of the windshield, and a directional jet nozzle for jetting a part of the washings as a secondary jet, which is a directional jet flow and independent from the diffusion jet flow, the nozzle body includes a supply passage for delivering the washings, both the nozzle chip and an inner wall of the chip accommodation portion of the nozzle body provide a diffusion jet passage and a directional jet passage, the diffusion jet passage connects the diffusion jet nozzle and the supply passage, and has an oscillation chamber for self-oscillating the washings delivered from the supply passage, the directional jet passage connects the directional jet nozzle and the supply passage, and is independent from the diffusion jet passage, and the directional jet nozzle is provided by a through hole connecting to the directional jet passage, the through hole being formed in the nozzle chip independently from the nozzle body.

6. The washer equipment according to claim 5, wherein the through hole providing the directional jet nozzle has an axial angle in a vertical plane between a horizontal plane and an axis of the through hole, and wherein the axial angle of the through hole is determined independently from an assembling angle in a vertical plane between the horizontal plane and an assembling axis of the nozzle chip being assembled in the chip accommodation portion.

7. The washer equipment according to claim 5, wherein the directional jet nozzle includes a jet nozzle rotatably engaged in a concavity of the through hole.

8. The washer equipment according to claim 5, wherein the primary jet element is provided by a primary jet nozzle, and the secondary jet element is provided by a secondary jet nozzle, and wherein both the primary and secondary jet nozzles are disposed in the single washer nozzle.

9. The washer equipment according to claim 8, wherein the primary jet nozzle is separated from the secondary jet nozzle.

10. The washer equipment according to claim 8, wherein the primary jet nozzle is integrated with the secondary jet nozzle.

11. The washer equipment according to claim 5, wherein the directional jet passage includes a plurality of jet passages branching from the supply passage, and wherein the directional jet nozzle includes a plurality of through holes connecting to each jet passage, respectively.

12. The washer equipment according to claim 5, wherein the directional jet passage includes a current plate integrally protruded in the directional jet passage for rectifying directional jet flow.

13. Washer equipment for jetting washings to each sweeping area of driver's side and passenger's side windshield of a vehicle, which are swept by driver's side and passenger's side wiper blades, respectively, in such a manner that they synchronize together and move to a same direction, the washer equipment comprising a primary jet element and a secondary jet element, wherein the primary jet element splashes the washings as a primary jet down to a first splashdown disposed in each sweeping area of the driver's side and passenger's side wiper blades, the primary jet being a diffusion jet flow diffused in a lateral direction of the vehicle, the secondary jet element splashes the washings as a secondary jet down to a second splashdown disposed upper side of the sweeping area of the driver's side wiper blade and disposed outside an upper reverse position of the passenger's side wiper blade, the secondary jet being a directional jet flow having directivity, being jetted concentrically, and being independent from the diffusion jet flow, the secondary jet element is provided by a secondary jet nozzle for jetting the washings as the directional jet flow having directivity and being jetted concentrically, the primary jet has a distribution of the washings, in which an amount of the washings at both ends of the fan shape of the diffusion let flow is larger than that at a center portion of the fan shape of the diffusion jet flow, and the secondary jet concentrically jets as the directional jet flow toward the center portion of the fan shape of the diffusion jet flow.

14. The washer equipment according to claim 13, wherein the primary jet has a primary jet angle in a vertical plane between the primary jet and a horizontal plane, and the secondary jet has a secondary jet angle in the vertical plane between the secondary jet and the horizontal plane, the secondary jet angle being predetermined in relation to the primary jet angle.

15. The washer equipment according to claim 13, wherein the primary jet element is provided by driver's side and passenger's side primary jet nozzles, which are separated from each other, wherein the driver's side primary jet nozzle jets the washings toward the first splashdown disposed in the sweeping area of the driver's side, and wherein the passenger's side primary jet nozzle jets the washings toward the first splashdown disposed in the sweeping area of the passenger's side.

16. The washer equipment according to claim 15, wherein each primary jet nozzle includes a primary jet outlet for jetting the primary jet by self-oscillating the washings so as to provide the diffusion jet flow having a fan shape.

17. The washer equipment according to claim 13, wherein the secondary jet element is provided by a secondary jet nozzle, which is independent from the primary jet element for providing the primary jet.

18. The washer equipment according to claim 13, wherein the primary and secondary jet elements splash the washings before a sweeping operation of each wiper blade in a case where both the driver's and passenger's wiper blades stop at a lower reverse position.

19. Washer equipment for jetting washings to each sweeping area of driver's side and passenger's side windshield of a vehicle, which are swept by driver's side and passenger's side wiper blades, respectively, in such a manner that they synchronize together and move to a same direction, the washer equipment comprising a primary jet element and a secondary jet element, wherein the primary jet element splashes the washings as a primary jet down to a first splashdown disposed in each sweeping area of the driver's side and passenger's side wiper blades, the primary jet being a diffusion jet flow diffused in a lateral direction of the vehicle, the secondary jet element splashes the washings as a secondary jet down to a second splashdown disposed upper side of the sweeping area of the driver's side wiper blade and disposed outside an upper reverse position of the passenger's side wiper blade, the secondary jet being a directional jet flow having directivity, being jetted concentrically, and being independent from the diffusion jet flow, at least the primary and secondary jet elements of the driver's side are provided by a single washer nozzle, the single washer nozzle includes a nozzle body mounted on the vehicle and having a chip accommodation portion, a nozzle chip engaged in the chip accommodation portion water-tightly, a primary jet nozzle for jetting the washings as the primary jet, and a secondary jet nozzle for jetting a part of the washings as the secondary jet, the nozzle body includes a supply passage for flowing the washings, both the nozzle chip and an inner wall of the chip accommodation portion of the nozzle body provide a diffusion jet passage and a directional jet passage, the diffusion jet passage connects the primary jet nozzle and the supply passage, and has an oscillation chamber for self-oscillating the washings delivered from the supply passage, the directional jet passage connects the secondary jet nozzle and the supply passage, and is independent from the diffusion jet passage, and the secondary jet nozzle is provided by a through hole connecting to the directional jet passage, the through hole being formed in the nozzle chip independently from the nozzle body.

20. The washer equipment according to claim 19,
wherein the through hole providing the directional jet nozzle has an axial angle in a vertical plane between a horizontal plane and an axis of the through hole, and
wherein the axial angle of the through hole is determined independently from an assembling angle in the vertical plane between the horizontal plane and an assembling axis of the nozzle chip being assembled in the chip accommodation portion.

21. The washer equipment according to claim 19, wherein the directional jet nozzle includes a jet nozzle rotatably engaged in a concavity of the through hole.

22. The washer equipment according to claim 19,
wherein the primary jet element is provided by a primary jet nozzle, and the secondary jet element is provided by a secondary jet nozzle, and
wherein both the primary and secondary jet nozzles are disposed in the single washer nozzle.

23. The washer equipment according to claim 22, wherein the primary jet nozzle is separated from the secondary jet nozzle.

24. The washer equipment according to claim 22, wherein the primary jet nozzle is integrated with the secondary jet nozzle.

* * * * *